Feb. 11, 1941.   L. KAMENAROVIĆ   2,231,810

FLUX VARIATOR

Filed Feb. 4, 1939

Inventor:
L. Kamenarović
By E. F. Wunderoth
Atty

Patented Feb. 11, 1941

2,231,810

UNITED STATES PATENT OFFICE 2,231,810

FLUX VARIATOR

Leone Kamenarović, Milan, Italy, assignor to Fabbrica Italiana Magneti Marelli Società Anonima, Milan, Italy, a corporation of Italy Application February 4, 1939, Serial No. 254,703
In Italy February 7, 1938

5 Claims. (Cl. 175—183)

As known, to carry out a measurement of magnetic fluxes, say in respect of magnets and electromagnets, flux-meters are used which include a ballistic galvanometer giving an indication as to an impulse of electric current which is induced in a winding interlinked with the magnetic flux to be measured by effect of a variation of said interlinked flux from its full value to a zero value or vice versa.

For such a purpose devices are used which include a winding located on a core and a variation in the flux is generated by moving the contemplated electromagnet or magnet towards or from said core.

The devices of the above stated class involve practical objections and such indications as may be secured by them are not sufficiently correct; on the other hand the flux-meters adapted to develop more satisfactory measurements are exceedingly complicated.

This invention has for its object a flux variator adapted to be used in connection with flux-meters of the above stated class which provides for obtaining measurements having a very high precision and may be manipulated in a simple and efficient manner.

In the device of this invention the variation in the flux interlinked with a winding is secured by causing a respective angular displacement of the path of said flux and winding, which provides for obtaining a flux reversal with respect to the winding and consequently an absolute variation which corresponds with a change from a maximum value having a given sign to a maximum value having an opposed sign.

An embodiment of this invention is shown by way of example on the annexed drawing and:

Figure 1:
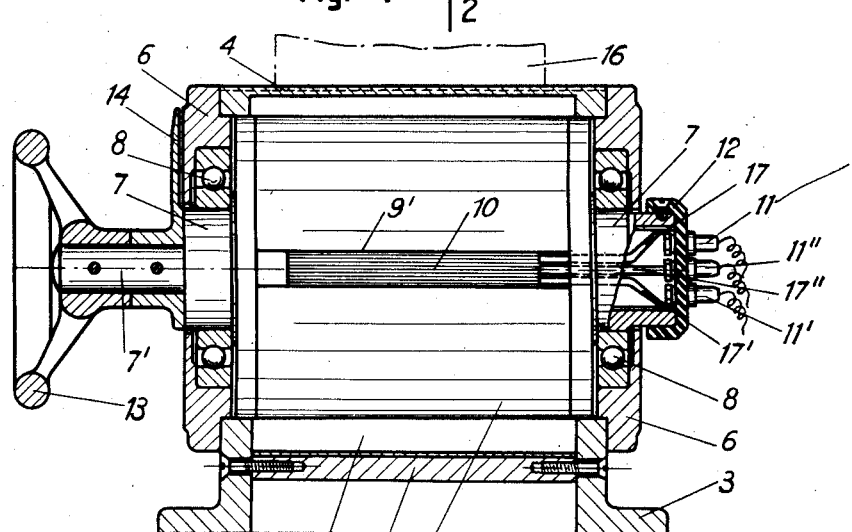
Fig. 1 is a longitudinal section of the device on line 1—1 of Fig. 2.
Figure 2:
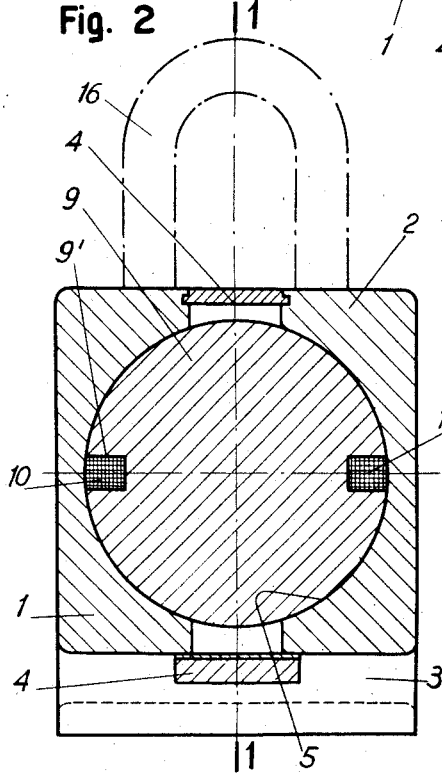
Fig. 2 is a transverse section thereof on line 2—2 of Fig. 1.
Figure 3:
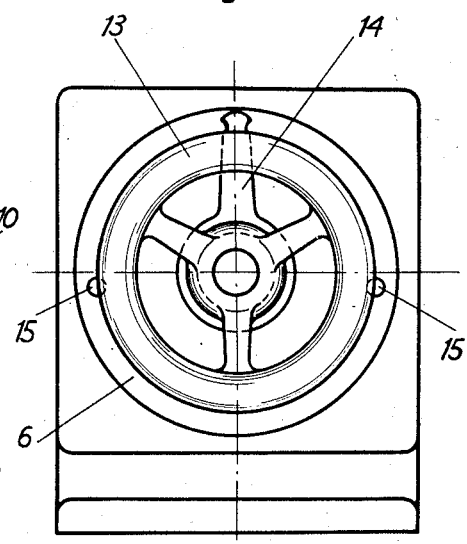
Fig. 3 is a front view thereof, the winding and the core carrying it being in a position in register with the mean position of their possible angular displacement.

As illustrated, the device includes a stator consisting of two magnetic-material pole shoes 1 and 2 fastened on a non-magnetic bottom support 3 and magnetically insulated by non-magnetic plates 4; the pole shoes 1 and 2 provide in their whole a cylindrical room 5 in which a core 9 is mounted to rotate, said core being supported in non-magnetic heads 6 by means of spindles 7 and bearings 8. The core 9 has slots 9' in which a winding 10 is located.

The ends of the winding 10 are connected with terminals 11, 11' fast on a terminal plate 12 and adapted for connection with a circuit including a galvanometer not shown; the winding 10 has also an intermediate connection with a further terminal 11" to enable the operator to adjust the voltage obtainable across the device terminals.

The connections intermediate the winding 10 and the terminals 11, 11', 11" may be secured by means of flexible leads as 17, 17', 17", no slip contact being required in view of the restricted angular motion the rotor 9—10 is caused to effect with respect to the stator 1, 2 and the terminals 11, 11', 11".

For operation the core 9 has a hand wheel 13 fast on an extension 7' of one of the pivot spindles 7 and a stop arm 14 is also fast on said spindle extension 7' said arm 14 cooperating with stationary studs 15 fast on the stator; said studs 15 define the angle the rotor 9, 10 is moved through in each operation this angle being assumed to be 180° in the illustrated construction.

Assuming a galvanometer (not shown) to be connected with a preferred pair of terminals 11, 11', 11", a magnet 16 whose flux is to be measured is located on the stator with its opposite pole faces in contact with the stator pole shoes 1, 2; thereafter the hand wheel 13 is manipulated to cause the rotor 9—10 to move through the range provided for by the studs 15; the interlinking of the magnetic flux of said magnet 16 with the winding 10, said flux flowing say from pole shoe 1 to pole shoe 2 through the core 9, is thus caused to vary from a maximum value having a given sign to a maximum value having an opposed sign and thus a so large as obtainable impulse of induced voltage is secured across the terminals 11, 11', 11" for the energisation of a galvanometer.

Of course by a proper arrangement of the winding 10, stop studs 15 and pole shoes 1, 2 the described operation may be carried out by angular displacements of the rotor 9, 10 which are different from the 180° one which is assumed in the described embodiment.

What I claim as my invention and desire to secure by United States Letters Patent is:

1. A device for testing the magnetic properties of permanent magnets and electromagnets by measuring an impulse of current induced in a movable winding by variation of the magnetic flux of said magnets interlinking with said winding, comprising two spaced and co-extensive magnetic pole shoes providing faces for location of the poles of the magnet to be tested thereon, said pole shoes forming in their opposite faces arc-shaped depressions defining together a split cylindrical seat, a non-magnetic member supporting said pole shoes, a solid cylindrical core of magnetic material fitting in said seat, pivot spindles fast with said core and supporting it for oscillation on said support member in said seat, said core being provided with longitudinal slots along two diametrically opposed regions thereof, a winding located in said core slots, means for connecting said winding with a measuring instrument, and a manual operating member fast with one of said spindles and said core for oscillating said core by hand manipulation.

2. A device for testing the magnetic properties of permanent magnets and electromagnets by measuring an impulse of current induced in a movable winding by variation of the magnetic flux of said magnets interlinking with said winding, comprising two spaced and co-extensive magnetic pole shoes providing faces for location of the poles of the magnet to be tested thereon, said pole-shoes forming in their opposite faces arc-shaped depressions defining together a split cylindrical seat, a non-magnetic member supporting said pole shoes, a solid cylindrical core of magnetic material fitting in said seat, pivot spindles fast with said core and supporting it for oscillation on said support member in said seat, said core being provided with longitudinal slots along two diametrically opposed regions thereof, each of said slots extending over an arc which is small with respect to the arc through which each of said pole shoe depressions extends in said seat, a winding located in said core slots, means for connecting said winding with a measuring instrument, and a manual operating member fast with one of said spindles and said core for oscillating said core by hand manipulation.

3. A device for testing the magnetic properties of permanent magnets and electromagnets by measuring an impulse of current induced in a movable winding by variation of the magnetic flux of said magnets interlinking with said winding, comprising two spaced and coextensive magnetic pole shoes providing faces for location of the poles of the magnet to be tested thereon, said pole-shoes forming in their opposite faces arc-shaped depressed faces defining together a split cylindrical seat, a non-magnetic member supporting said pole shoes, a solid cylindrical core of magnetic material entirely filling said seat and contacting with said depressed pole-shoe faces, pivot spindles fast with said core and supporting it for oscillation on said support member in said seat, said core being provided with longitudinal slots along two diametrically opposed regions thereof, a winding located in said core slots, means for connecting said winding with a measuring instrument, and a manual operating member fast with one of said spindles and said core for oscillating said core by hand manipulation.

4. A device for testing the magnetic properties of permanent magnets and electromagnets by measuring an impulse of current induced in a movable winding by variation of the magnetic flux of said magnets interlinking with said winding, comprising two spaced and coextensive magnetic pole shoes providing faces for location of the poles of the magnet to be tested thereon, said pole-shoes forming in their opposite faces arc-shaped depressions defining together a split cylindrical seat, a non-magnetic member supporting said pole shoes, a solid cylindrical core of magnetic material fitting in said seat, pivot spindles fast with said core and supporting it for oscillation of said support member in said seat, said core being provided with longitudinal slots along two diametrically opposed regions thereof, each of said slots extending over an arc which is small with respect to the arc through which each of said pole shoe depressions extends in said seat, a winding located in said core slots, means for connecting said winding with a measuring instrument, a manual operating member fast with one of said spindles and said core for oscillating said core by hand manipulation, and means for defining the angle of oscillation of said spindles and core with respect to said pole shoes.

5. A device for testing the magnetic properties of permanent magnets and electromagnets by measuring an impulse of current induced in a movable winding by variation of the magnetic flux of said magnets interlinking with said winding, comprising two spaced and coextensive magnetic pole shoes providing faces for location of the poles of the magnet to be tested thereon, said pole-shoes forming in their opposite faces arc-shaped depressions defining together a split cylindrical seat, a non-magnetic member supporting said pole shoes, a solid cylindrical core of magnetic material fitting in said seat, heads of non-magnetic material fast on said support member, pivot spindles fast with said core and supporting it for oscillation on said heads in said seat, said core being provided with longitudinal slots along two diametrically opposed regions thereof, each of said slots extending over an arc which is small with respect of the arc through which each of said pole shoe depressions extends in said seat, a winding located in said core slots, a manual operating member fast with one of said spindles and said core for oscillating said core by hand manipulation, spaced abutments on one of said heads, a finger fast on the respective spindle and arranged to move between said abutments and cooperating therewith to define the angle of oscillation of said spindles and core with respect to said pole shoes, insulated terminals on one of said heads, and flexible connections each leading from a point of said winding to a respective one of said terminals.

LEONE KAMENAROVIĆ.